Aug. 30, 1927. M. B. CARY Re. 16,722
LAMP DEVICE
Original Filed Nov. 13, 1923
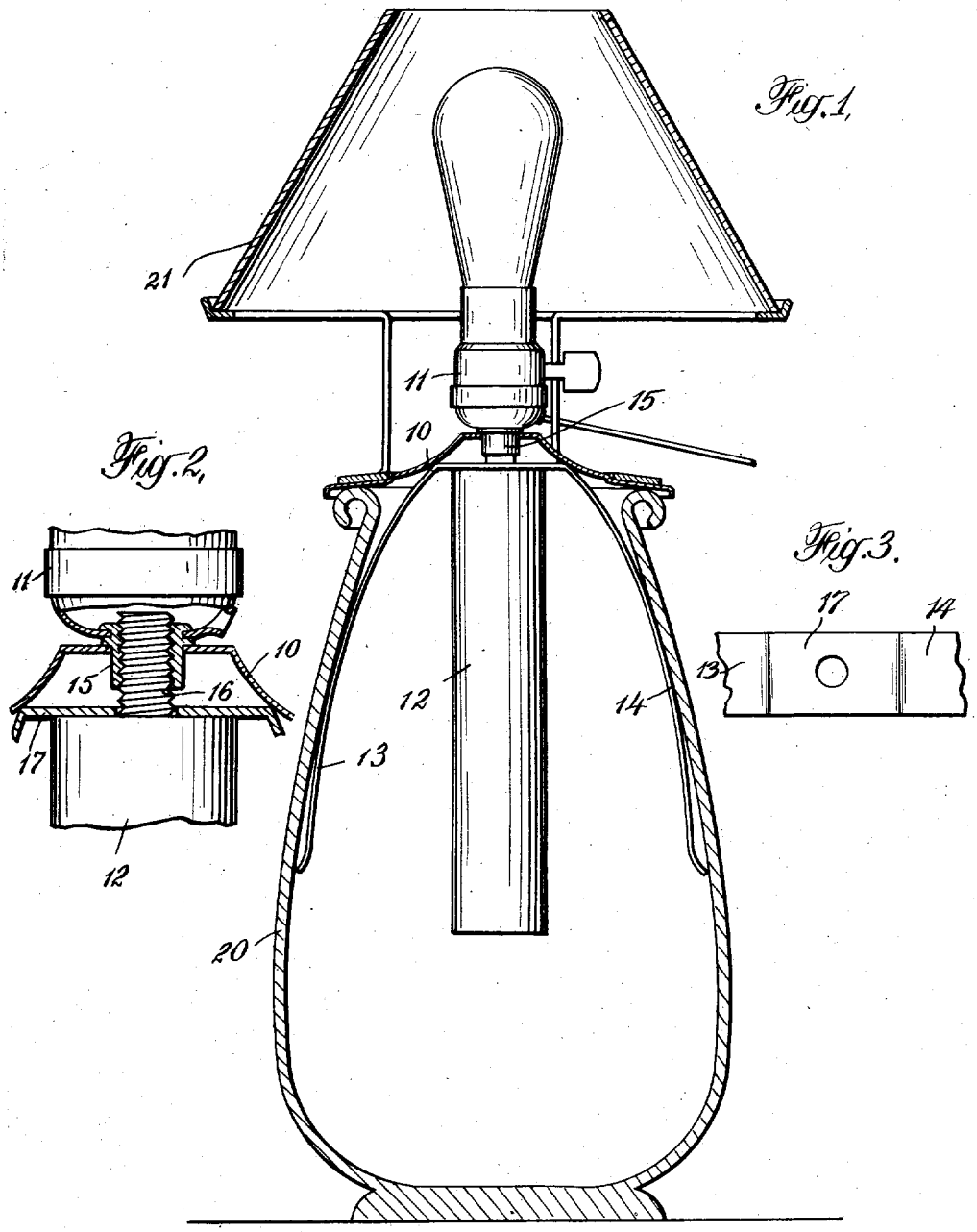
INVENTOR
Melbert B. Cary
BY
E. W. Marshall
ATTORNEY Reissued Aug. 30, 1927. Re. 16,722

UNITED STATES PATENT OFFICE.

MELBERT B. CARY, OF NEW YORK, N. Y., ASSIGNOR TO VASLAMP MANUFACTURING CORPORATION, OF NEW YORK, N. Y., A CORPORATION OF NEW YORK.

LAMP DEVICE.

Original No. 1,614,102, dated January 11, 1927, Serial No. 674,429, filed November 13, 1923. Application for reissue filed July 2, 1927. Serial No. 203,222.

This invention relates to lamp devices.

The invention particularly pertains to lamp devices adapted for use with vases, hollow bronzes or other ornamental receptacles.

One of the objects of the invention is to provide a device of the character specified that can be easily and quickly attached to the vase or other receptacle without requiring any preliminary adjustment of or the mutilation of the article to which the device is attached.

Another object of the invention is to provide a lamp device or attachment for vases or other receptacles so constructed that the lamp formed by the combination of the vase and attachment will be stable and not liable to tilt or tip and, furthermore, the attachment will be firmly held in position and will not be subject to displacement with respect to the receptacle in connection with which it is used.

Further objects of the invention will appear from the following specification taken in connection with the drawings, which form a part of this application, and in which Fig. 1 is a sectional elevation showing a lamp attachment constructed in accordance with the invention and mounted in a vase;

Fig. 2 is a detail sectional elevation illustrating the construction of the lamp device or attachment; and Fig. 3 is a plan view of a portion of the positioning spring.

The invention briefly described consists of a device comprising a disk adapted to seat on the open upper end of a vase or other receptacle, a weight secured to and depending from one side of the disk and a lamp socket secured to the opposite side of the disk and extending in a direction opposite to the weight. The weight maintains the device in upright position and stabilizes the lamp since it tends to prevent tilting of the vase or other receptacle. In order to prevent displacement of the lamp device with respect to the member on which it is supported, resilient means, such as leaf springs, are secured to the disk and extend away from the same side of the disk as the weight. These springs are preferably bowed outwardly and are adapted to engage the inner wall of the receptacle or vase, thereby securely retaining the lamp device in position on the receptacle. The leaf springs may be formed from a single strip, as illustrated in the drawings. Further details of the invention will appear from the following description.

Referring to the drawings, the lamp attachment comprises a disk 10 which may be of an ornamental character and is adapted to rest on the upper end of the receptacle 20, a lamp socket 11 secured to the disk and extending away from one surface thereof and a weight 12 secured to the opposite surface of the disk and disposed substantially in alinement with the lamp socket. The provision of the weight is important since vases although they may be stable in themselves are often not so designed as to properly support any additional structure superimposed thereon, such as a lamp and lamp shade. The weight, however, extends downwardly in the vase and materially stabilizes the structure.

In addition to the weight 12, further means is provided for securing the lamp attachment in position. This means consists of leaf springs 13 and 14 which in the form of the invention illustrated are integral and are secured to the disk and extend downwardly therefrom or away from the same side of the disk as that on which the weight is positioned. These leaf springs are preferably bowed outwardly as illustrated and are adapted to engage the inner wall of the vase or other receptacle on which the device is mounted. The springs effectively retain the device in position and tend to resist any relative movement of the lamp attachment on the article on which it is mounted.

The socket 11, weight 12, disk 10 and springs 13 and 14 are preferably secured together in the manner shown in Fig. 2. A threaded bushing or sleeve 15 is secured to the socket 11 and receives a threaded stud or rod 16, carried by or formed on the weight 12. Disk 10 is mounted on sleeve 15 and the central portion 17 of the spring strip forming springs 13 and 14 is apertured to receive the stud 16. The weight and stud are rotated until the spring strip and disk are firmly secured on the rod and sleeve.

A shade 21 of any desired form or contour can be mounted on the disk 10.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A lamp device comprising a disk, a lamp socket carried thereby at one side thereof, a stabilizing weight secured to the opposite side of the disk and resilient members extending away from the same side of the disk as the weight.

2. A lamp device comprising a disk, a lamp socket carried thereby at one side thereof, a weight member secured to the opposite side of the disk and resilient members extending away from the same side of the disk as the weight member, said resilient members being bowed outwardly away from the weight member.

3. A lamp device comprising a disk, a lamp socket carried thereby at one side thereof, a weight member secured to the opposite side of the disk and flat spring strips integral at one end thereof, and secured to the disk and having the other ends spaced from the weight.

4. A lamp device for use with a hollow receptacle and comprising a disk, a lamp socket carried thereby at one side thereof, a stabilizing weight secured to the opposite side of the disk and resilient members extending laterally with respect to the weight and engageable with the inner wall of the receptacle.

5. A lamp device comprising a disk, a lamp socket having a threaded sleeve secured thereto and extending through the disk, a weight having a threaded stud extending into the threaded sleeve and a resilient strip apertured to receive the stud and resting on the weight.

6. A lamp device comprising a disk, a lamp socket having a threaded sleeve secured thereto and extending through the disk, a weight having a threaded stud extending into the threaded sleeve and a resilient strip apertured to receive the stud and resting on the weight, the free ends of the strip extending laterally from the weight.

7. A lamp device comprising a disk, a lamp socket having a threaded sleeve secured thereto and extending through the disk, a weight having a threaded stud extending into the threaded sleeve and springs secured intermediate the weight and disk and extending away from the disk and laterally from the weight.

8. A lamp supporting device comprising a disk arranged to support a lamp and to limit its downward movement, a lamp socket projecting from one side of said disk, a one-piece flat metallic spring strip constructed with a central portion adapted to engage the underside of said disk and having a central hole therethrough and with oppositely bowed portions extending outwardly and downwardly from said central portion, said extending portions being adapted to press outwardly against a surrounding surface, a stud connected to said socket and passing through the disk and through the hole in the central portion of the spring, and means for rigidly affixing the spring to said stud.

9. A lamp device comprising a disk arranged to support a lamp and to limit its downward movement, a threaded sleeve, a lamp socket carried by said sleeve, a threaded stud disposed below said disk and extending therethrough and engaging said threaded sleeve, a one-piece flat metallic spring strip constructed with a central portion adapted to engage the underside of said disk and having a central hole therethrough and with oppositely bowed portions extending outwardly and downwardly from said central portion, said extending portions being adapted to press outwardly against a surrounding surface, said stud extending through the central hole in said spring strip, and means on said stud for pressing and holding the spring strip rigidly against the underside of said disk.

Signed at Edgartown, Mass., this 13th day of July, 1927.

MELBERT B. CARY.